Sept. 5, 1961  R. D. BARRETT  2,998,988
RETAINING MEANS FOR PREVENTING RELATIVE
AXIAL DISPLACEMENT BETWEEN MEMBERS
Filed Aug. 27, 1958  2 Sheets-Sheet 2
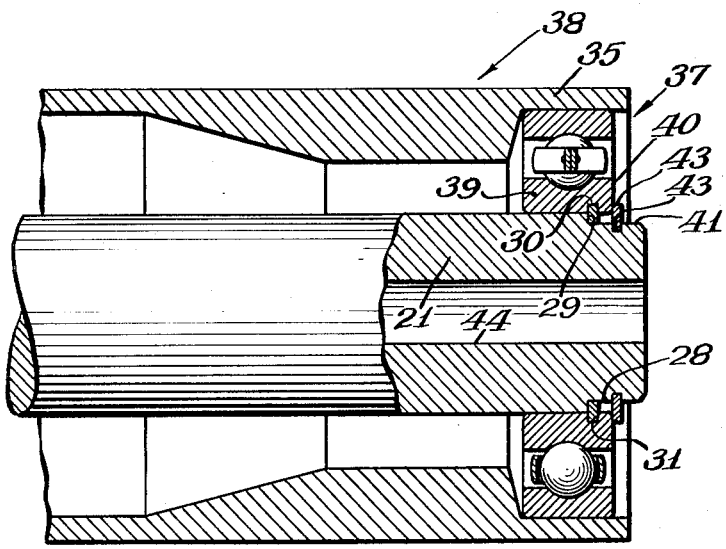
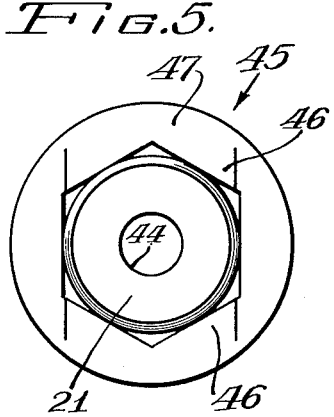
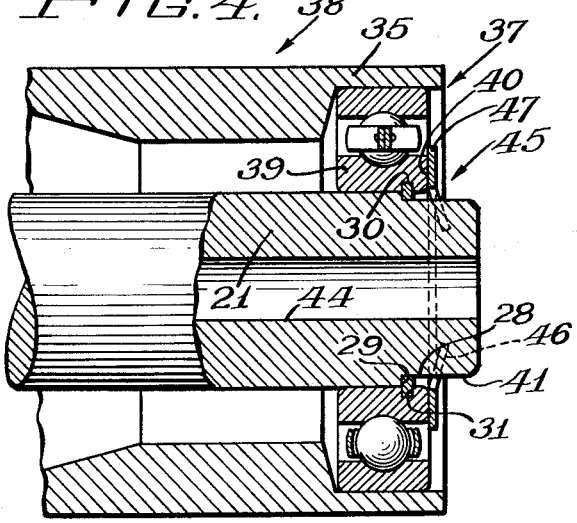
Inventor:
Robert D. Barrett
Atty.

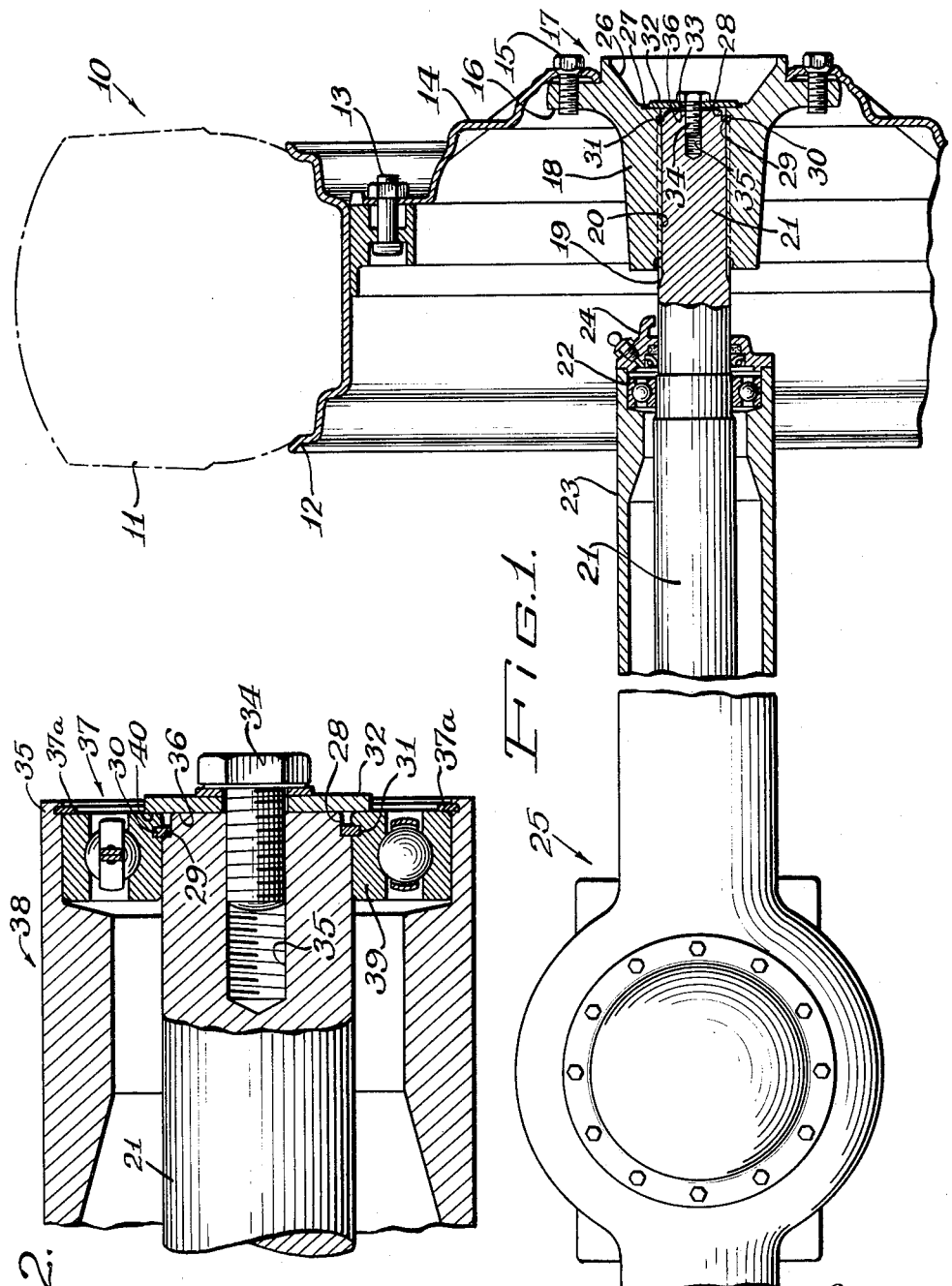

United States Patent Office 2,998,988
Patented Sept. 5, 1961

2,998,988
RETAINING MEANS FOR PREVENTING RELATIVE AXIAL DISPLACEMENT BETWEEN MEMBERS
Robert D. Barrett, Westchester, Ill., assignor to International Harvester Company, Chicago, Ill., a corporation of New Jersey
Filed Aug. 27, 1958, Ser. No. 757,614
5 Claims. (Cl. 287—53)

This invention relates to retaining devices and is particularly applicable to the provision of retention means for preventing axial displacement of units or elements concentrically arranged with respect to one another.

More specifically, the invention is concerned with a simplified, readily detachable and positive acting means for providing a two-way lock or axial retention device for structures or units such as anti-friction bearings, sprockets, pulleys, gear hubs, bellcranks and the like, when mounted on a shaft.

The present invention contemplates the use of a snap-ring mounted in an internal annular groove or recess in the outer one of two concentrically arranged units and which ring is cooperative with stop means fastenable to the inner one of said units to provide a two-way lock and thus prevent relative axial movement or displacement between said units.

Heretofore the devices provided for such purposes have been generally limited in their application and frequently involved arrangements, particularly in connection with mountings by recesses or grooves on shafts, which introduced structural weaknesses therein.

In devices of this character that employed split snap-ring elements mounted in annular grooves the arrangements used frequently resulted in the introduction of a stress concentration, because of the formation of a shoulder or the like, at a critical point in an axle or shaft, thus causing an objectionable weakness therein as well as a potential source of danger from breakdown.

It is an important feature of the present invention, therefore, to provide an improved, simplified and novel retention means for effecting a positive acting two-way lock operative for preventing relative axial displacement between concentrically arranged or mounted elements.

An important object, also, is to provide a retention means, for preventing relative axial displacement between concentrically arranged elements, which includes a split snap-ring mounted on a reduced diameter end portion of a shaft and is interlockingly engageable with an element mounted on said shaft for preventing axial displacement in one direction, and which cooperates with additional retention means carried by said shaft to prevent axial displacement in an opposite direction.

Another object is to provide a retention means, for preventing axial displacement of a component with respect to a shaft upon which it is mounted, which includes a snap-ring positioned within an interior annular groove in the component and abuttingly disposed against a shoulder proximate the end of the shaft to prevent displacement of said component in one direction, and which cooperates with stop means carried by the shaft to prevent displacement of the component in the opposite direction.

A more specific object is to provide a split, removable snap-ring, interlockingly disposed in an internal annular groove or recess in the inner race of a ball bearing mounted on a shaft, which is operative in conjunction with a washer and cap screw attached to the end of said shaft to provide a two-way lock for the bearing and shaft to prevent relative axial movement therebetween.

Another specific object is to provide a snap-ring mounted in an internal annular groove in an opening in one component and disposed in abutting relationship against a shoulder, formed on and adjoining the end section of a shaft inserted in said opening and upon which said component is mounted, to prevent relative axial displacement of the component in one direction, and which cooperates with radially extending stop means detachably affixed to the end portion of said shaft to prevent relative axial displacement of the component in the opposite direction.

A further object is to provide a unique snap-ring type of retention means for retaining a component mounted on a shaft against relative axial movement relative to the shaft and applicable proximate end of the shaft without introducing stress concentration or weakness in said shaft.

A general object of the invention is to provide a two-way lock retaining device that may be applied to a reduced diameter end section of a shaft for retaining a member mounted on the shaft against axial movement relative thereto and without producing any stress raising in the shaft.

The foregoing and other objects and advantages are attained by the present invention, various novel features of which will be apparent from the description herein and the accompanying drawings disclosing several embodiments of the invention, and will be more particularly pointed out in the appended claims. For a better understanding of the invention, reference may be had to the accompanying drawings in which:

FIGURE 1 is a fragmentary vertical sectional view (partially in elevation) of a vehicle wheel and its associated mounting axle assembly and showing the application of the present invention for preventing axial displacement of a wheel with respect to its mounting axle;

FIGURE 2 is a fragmentary vertical sectional view of a ball bearing mounted on a shaft and showing an embodiment of the presently proposed retention means;

FIGURE 3 is a fragmentary sectional view similar to FIGURE 2, but showing a modified form of the proposed retaining means and shown as employed with a hollow or centerless shaft;

FIGURE 4 is a view generally similar to FIGURE 3, but showing another modified form of the proposed retaining means; and FIGURE 5 is an elevational view of the lock-washer element employed with the modified form of the invention shown in FIGURE 4.

In FIGURE 1 there is depicted an application of one preferred form or embodiment of the present invention. In this application it will be noted the proposed construction is employed to retain the rear traction wheel of a vehicle against axial displacement relative to its associated driving axle. A conventional traction wheel, such as is frequently used on tractor vehicles and indicated generally by the reference numeral 10, will be seen to include a pneumatic tire 11 mounted on a rim 12 affixed by suitable bolt and nut means, such as shown at 13, to a disc 14 that, in turn, is secured by a plurality of bolts 15 to the radial flange 16 of a hub 17. The hub 17 is fashioned with an axially extending portion 18 having a longitudinal opening 19 that is splined, as seen at 20, to receive one end of a splined driving shaft or axle 21. Said axle may be journalled, by a conventional bearing 22, in a housing 23 and provided with a conventional liquid seal 24 adjacent said bearing for purposes which are well understood. The housing 23 is formed as part of the tractor's final drive assembly, indicated generally at 25, and may be carried or mounted on the frame or chassis (not shown) of the vehicle in conventional manner, but since these elements form no particular part of the invention the details thereof have not been illustrated in the attached drawings.

The wheel hub 17 may be formed at one end thereof with a conical-shaped recess 26 which is contiguous to a recess 27 adjacent the splined opening 19 therein. The axle 21 is fashioned with a reduced diameter portion 28 that provides a shoulder 29, at the junction of said shaft portions, for abuttingly receiving a split snap-ring 30, mounted in an annular recess 31 in the hub 17, which extends radially inwardly from said recess to abut said shoulder. A washer-like thrust plate, disc or retainer 32, dimensioned so as to extend into and seat in the recess 27, has an opening 33 in the center thereof for the shank of a bolt 34 which is threadably received in a threaded recess 35, axially extending inwardly from the end face 36 of said axle, while the head thereof engages the plate 32. With the snap-ring 30 in place and the plate 32, pulled up by the bolt 34, into closely abutting relationship with the recess 27 and the end face 36, of axle 21, it will be appreciated that the wheel 10 is constrained against axial displacement or movement in either direction relative to said axle. By positioning the snap-ring 30 in a recess or groove disposed in the wheel hub adjacent a reduced diameter section of the axle it is possible to avoid the introduction of any stress concentration, such as would generally be the case if the snap-ring was mounted in an annular groove formed in the axle adjacent the inner end of the wheel hub, and thereby facilitate the maintenance of full strength in the axle. Retention in the presently proposed instance will be effected proximate the end of the shaft or axle where this is a minimum of stress and this, of course, has the effect of providing improved strength, because the stress concentration that is usually present when such devices are used will be absent.

In FIGURE 2 there is illustrated another application of the preferred form of the invention and wherein like reference numerals have been used to indicate like elements previously described. In this instance, the proposed retaining device is employed for retaining an anti-friction bearing against axial displacement, and, as shown, in this particular application the axle or shaft 21 is journalled by the anti-friction bearing 37 fixedly positioned in a suitable housing or supporting structure, such as indicated generally at 38, by a snap-ring 37a mounted in an annular groove therein. The shaft 21 is fashioned, as before, with the reduced diameter portion 28 thereof forming the shoulder 29 that abuttingly receives the snap-ring 30. In this instance, however, the snap-ring 30 is mounted in an annular groove or recess 31 formed in the inner race 39 of the bearing 37 and said ring extends radially inwardly from there to said shoulder. The thrust or end plate stop or retainer member 32 is closely positioned against the end face 36 of the shaft 21 and against the side face 40 of said bearing by the cap screw or bolt 34 which, in turn, is threadably received in the threaded axle recess 35 in the shaft 21.

In FIGURE 3 there is shown a modification of the form of the invention illustrated in FIGURE 2. In this modified form the reduced diameter portion 28 of the shaft 21 is axially extended, as shown at 41, beyond the vertical plane of the face 40, of bearing 37, and is provided with an annular groove 42 into which there is positioned an enlarged snap-ring 43. The snap-ring 43 is dimensioned so as to extend outwardly over the inner edge of the face 40 of said bearing and as thus disposed, will be seen, cooperates with the internally disposed snap-ring 30 to retain the bearing 37 against axial displacement or movement in both axial directions. With an arrangement such as this it becomes possible to use a centerless or open-center shaft, such as indicated by the axially extending opening shown at 44, thus effecting a substantial cost reduction by being able to use such a shaft in lieu of the more expensive ground-on-center type most frequently employed for such purposes.

In FIGURES 4 and 5 there is depicted another modification of the form of the invention illustrated in FIGURE 2. In the modified form of FIGURE 4 the reduced diameter portion 28, of shaft 21, is axially extended, as before, beyond the vertical plane of the face 40 of bearing 37, as shown at 41, and is adapted to supportingly receive and carry a fastening washer such as the resilient Speed-Nut type of washer represented generally at 45. Although this type of locking washer is well known the particular one illustrated herein is a product of Tinnerman Products Company and will be seen to grip the extended portion 41 of the shaft 21 by means of the resilient gripping prongs or tines 46 punched or pressed out therefrom, while an outer ring portion 47 of said washer abuts the outer face 40, of bearing 37, and as thus disposed the respectively associated parts are constrained against movement in one axial direction.

As before, the internal snap-ring 30 is mounted in an annular groove or recess 31, in the inner race 39 of bearing 37, and said ring extends into abutting relation with the shoulder 29 on shaft 21. It will now be apparent that the Speed-Nut type washer 45 which grips the shaft extension 41 and also engages the outer face 40 of the bearing 37 cooperates with the internally disposed snap-ring 30 to retain said bearing against axial displacement in either axial direction.

The embodiments of the invention chosen for the purposes of illustration and description herein are those preferred for achieving the objects of the invention and developing the utility thereof in the most desirable and facile manner, due regard being had to existing factors of economy, simplicity of design and construction and the improvements sought to be effected. It will be appreciated, of course, that the particular structural and functional aspects emphasized here are not intended to exclude, but rather to suggest, such other adaptations and modifications of the invention as fall within the spirit and scope of the invention as defined in the appended claims.

What is claimed is:

1. For use with an anti-friction bearing having an inner race mounted in close fitting relation on a shaft proximate an end thereof, detachable means for retaining said bearing against axial displacement relative to said shaft, including, having the inner race of said bearing provided with an annular recess disposed axially inwardly from an outer end surface of the race a distance substantially less than the axially extending distance of said race and fashioned to provide a pair of axially spaced radially extending and parallel surfaces therein and opening radially inwardly toward said shaft and having an annularly extending shoulder-like abutment formed by a reduced section portion of said shaft in close proximity to the end thereof extending into said bearing with a snap-ring interlockingly disposed in said recess in closely abutting relation between the radially extending surfaces thereof and extending radially inwardly therefrom into abutting relation with the shoulder of said shaft to prevent axial displacement in one direction of said bearing relative to said shaft, and abutment means including a radially extending member detachably mounted against axial movement on said shaft and extending therefrom and into axially abutting engagement with the inner race of said bearing to prevent axial displacement in an opposite direction of said bearing relative to said shaft.

2. Means for preventing relative axial displacement between members when said members are mounted in closely fitting relation one within the other, comprising: detachable interlocking means including having an annularly extending recess formed in the outer one of said members in close proximity to an exterior end surface thereof and with said recess being fashioned to provide a pair of axially spaced radially extending parallel surfaces therein and having the inner one of said members fashioned with a reduced section and portion providing an annularly extending shoulder disposed in close proximity to the end thereof that is mountably disposed within the outer one of said members and having a snap-ring element inter-lockingly seated in said recess in closely abutting relation between the radially extending surfaces thereof and extending radially inwardly therefrom into abutting relation with the shoulder of said inner member to prevent relative axial displacement in one direction between said members; said outer and inner members having exterior end surfaces that are contiguous and lie in the same radial plane; a radially extending plate-like element detachably affixed to the central portions of the inner one of said members and disposed in closely abutting relation to an end face of said inner member and extending into overlapping and axially abutting relation with a radially extending exterior surface of the outer one of said members to prevent relative axial displacement in an opposite direction between said members.

3. Means for preventing relative axial displacement between members when said members are mounted in closely fitting relation one within the other, comprising: detachable interlocking means, including, having an annularly extending recess formed in the outer one of said members in close proximity to an exterior end surface thereof and with said recess providing a pair of axially spaced radially extending and parallel surfaces therein and having the inner one of said members fashioned with a reduced section end portion providing an annularly extending shoulder disposed in close proximity to the end thereof that is mountably disposed within the outer one of said members and having a snap-ring element interlockingly seated in said recess in closely abutting relation between the radially extending surfaces thereof and extending radially inwardly therefrom into abutting relation with the shoulder of said inner member to prevent relative axial displacement in one direction between said members; the inner one of said members having an additional annular recess formed therein on the reduced section end portion at a point outside the plane of an exterior end surface of the outer of said members, and a snap-ring element seated in said latter recess and extending therefrom and axially abutting with the exterior end surface of the outer one of said members to prevent axial displacement in an opposite direction between said members.

4. Means for preventing relative axial displacement between members when said members are mounted in closely fitting relation one within the other, comprising: detachable interlocking means including having an annularly extending recess formed in the outer one of said members in close proximity to an exterior end surface thereof with said recess providing a pair of axially spaced radially extending and parallel surfaces therein and having the inner one of said members fashioned with a reduced section end portion providing an annularly extending shoulder disposed in close proximity to the end thereof that is mountably disposed within the outer one of said members and having a snap-ring element interlockingly seated in said recess in closely abutting relation between the radially extending surfaces thereof and extending radially inwardly therefrom into abutting relation with the shoulder of said inner member to prevent relative axial displacement in one direction between said members; a washer-like element mounted on the reduced section end portion of the inner one of said members and extending therefrom and axially abutting with an exterior end surface of the outer one of said members, said element having gripping means formed thereon for engaging the reduced section portion of the inner one of said members and having said element operative to prevent relative axial displacement in an opposite direction between said members.

5. Means for retaining a wheel member against axial displacement relative to an axle upon which said wheel is mounted in closely fitting relation, comprising: a hub portion affixed to said wheel and having an axial opening therethrough adapted to mountably receive one end of the axle therein and having a radially extending end surface adjacent one end of said opening; said axle being fashioned with a reduced diameter portion forming an annular shoulder closely adjacent the end of said axle disposed within said hub; said hub having an annularly extending recess disposed in close proximity to said radially extending end surface and formed to provide a pair of radially extending and axially spaced shoulders therein and having said recess opening into the interior of the axial opening therethrough; a removable snap-ring interlockingly seated in said recess in closely abutting relation between the radially extending surfaces thereof and extending radially inwardly therefrom into abutting relation with the shoulder of said axle to prevent relative axial displacement in one direction between said wheel and axle; a disk-like element detachably affixed to the end of said axle and disposed in closely abutting relation to the end face of the axle and extending into overlapping and axially abutting relation with the radially extending end surface of said hub to prevent relative axial displacement in an opposite direction between said wheel and axle.

References Cited in the file of this patent
UNITED STATES PATENTS

| | | |
|---|---|---|
| 1,696,635 | Jennings | Dec. 25, 1928 |
| 2,432,621 | Grabowski | Dec. 16, 1947 |
| 2,475,042 | McCloskey | July 5, 1949 |
| 2,611,632 | Harris | Sept. 23, 1952 |

FOREIGN PATENTS

| | | |
|---|---|---|
| 636,071 | Great Britain | Apr. 19, 1950 |

OTHER REFERENCES

"Product Engineering," published by McGraw-Hill Co., "Rings for Fastenings," page 455, December 1933. (Copy in Div. 45.)